(12) United States Patent
Ushiyama et al.

(10) Patent No.: US 7,504,766 B2
(45) Date of Patent: Mar. 17, 2009

(54) COLOR FILTER, METHOD OF MANUFACTURING A COLOR FILTER, DISPLAY APPARATUS, ELECTRO-OPTICAL APPARATUS, AND ELECTRONIC APPLIANCE

(75) Inventors: Toshihiro Ushiyama, Chino (JP); Hisashi Aruga, Fujimi-machi (JP)

(73) Assignee: Seiko Epson Corporation, Tokyo (JP)

( * ) Notice: Subject to any disclaimer, the term of this patent is extended or adjusted under 35 U.S.C. 154(b) by 540 days.

(21) Appl. No.: 10/911,606

(22) Filed: Aug. 5, 2004

(65) Prior Publication Data

US 2005/0057130 A1 Mar. 17, 2005

(30) Foreign Application Priority Data

Aug. 12, 2003 (JP) .............................. 2003-292471

(51) Int. Cl.
*H01J 5/16* (2006.01)
*H01J 1/62* (2006.01)
*H01J 63/04* (2006.01)

(52) U.S. Cl. .................... 313/110; 313/483; 313/498; 313/506

(58) Field of Classification Search .......... 313/110–112
See application file for complete search history.

(56) References Cited

U.S. PATENT DOCUMENTS

| | | | | |
|---|---|---|---|---|
| 5,877,832 | A * | 3/1999 | Shimada | 349/43 |
| 6,801,274 | B2 | 10/2004 | Suzuki | |
| 7,378,790 | B2 * | 5/2008 | Aruga et al. | 313/500 |
| 2003/0025977 | A1 * | 2/2003 | Takizawa et al. | 359/253 |
| 2003/0030055 | A1 * | 2/2003 | Nakano et al. | 257/72 |
| 2003/0063239 | A1 * | 4/2003 | Suzuki | 349/106 |
| 2006/0109401 | A1 * | 5/2006 | Yang et al. | 349/112 |

FOREIGN PATENT DOCUMENTS

| | | |
|---|---|---|
| JP | A 11-183892 | 7/1999 |
| JP | A-11-316383 | 11/1999 |
| JP | A 2002-287131 | 10/2002 |
| JP | A-2003-76342 | 3/2003 |
| JP | 2003-121831 A | 4/2003 |
| JP | A-2003-122273 | 4/2003 |
| JP | 2003-167244 A | 6/2003 |
| JP | 2003-197245 A | 6/2003 |
| JP | A 2003-167245 | 6/2003 |

(Continued)

OTHER PUBLICATIONS

English translation of KR 2003047862 (Nakano et al.).*

(Continued)

*Primary Examiner*—Nimeshkumar D. Patel
*Assistant Examiner*—Natalie K Walford
(74) *Attorney, Agent, or Firm*—Oliff & Berridge, PLC

(57) ABSTRACT

To enhance the brightness and contrast of a display, and to enhance the visibility of a color filter, a color filter includes a substrate that transmits light, a reflective layer that is formed on the substrate and includes openings, boundary layers formed on parts of the reflective layer, and a plurality of colored layers that are surrounded by the boundary layers. As the boundary layers, boundary layers that transmit light are formed between colored layers of the same color and boundary layers that do not transmit light are formed between colored layers of different colors.

18 Claims, 10 Drawing Sheets

FOREIGN PATENT DOCUMENTS

| | | |
|---|---|---|
| JP | 2003-215561 A | 7/2003 |
| JP | A 2004-29831 | 1/2004 |
| KR | A-1999-0074556 | 10/1999 |
| KR | A-2003-0010547 | 2/2003 |
| KR | 2003047862 A * | 6/2003 |
| KR | A-2003-0044238 | 6/2003 |

OTHER PUBLICATIONS

English translation of KR 2003-047862 (Nakono et al) dated Jun. 2003.*

* cited by examiner

COLOR FILTER, METHOD OF MANUFACTURING A COLOR FILTER, DISPLAY APPARATUS, ELECTRO-OPTICAL APPARATUS, AND ELECTRONIC APPLIANCE

BACKGROUND OF THE INVENTION

1. Field of Invention

An exemplary aspect of the present invention relates to a color filter with favorable visibility, a method of manufacturing the color filter, a display apparatus, an electro-optical apparatus, and an electronic appliance.

2. Description of Related Art

In a related art liquid crystal display apparatus which has both a reflective-type display using external light and a transmissive-type display using a backlight and in which colored layers to achieve a color display are arranged so as to contact each other with no gaps in between, when using the reflective-type display, incident light from the outside passes through the colored layers to become colored light, so that part of the incident light is absorbed by the colored layers, resulting in the problem of the display achieved by the colored light being dark. For this reason, as disclosed by Japanese Unexamined Patent Publication No. H11-183892, uncolored openings are provided in parts of the colored layers, reflective layers are provided corresponding to the openings, and external incident light is reflected as uncolored light without being absorbed by the colored layers, so that in concert with the colored light, a bright display of images is achieved.

SUMMARY OF THE INVENTION

However, with the related art described above, to produce an uncolored layer as openings in parts of the colored layers, it is necessary to form the colored layer split into the colored parts and the uncolored parts. Also, since the colored layers are arranged adjacently with no gaps in between without using boundary layers as boundaries between the respective colored layers, overlapping of colors between color layers and gaps with no colors occur irregularly, so that there has been a problem of displayed images having poor contrast not just for the reflective-type display but also for the transmissive-type display.

For this reason, an exemplary aspect of the present invention provides a color filter that produces bright, high contrast images with superior visibility, a method of manufacturing a color filter, a display apparatus, an electro-optical apparatus, and an electronic appliance.

A color filter according to an exemplary aspect of the present invention includes: a substrate that transmits light; a reflective layer that is formed on the substrate and includes openings; boundary layers formed on part of the reflective layer; and a plurality of colored layers surrounded by the boundary layers, the boundary layers that are positioned between colored layers of a same color transmit light and the boundary layers that are positioned between colored layers of different colors do not transmit light.

With this construction, by providing boundary layers at the boundaries of the colored layers, the boundary layers can be regularly arranged so that the irregular overlapping of colors between colored layers and the presence of uncolored parts are eradicated. The display colors can be enhanced without the respective colors becoming muddled. In addition, since external incident light that passes the boundary layers that transmit light is emitted as reflected light with a drop in brightness being suppressed, the brightness of the display is enhanced. Also, boundary layers that do not transmit light are formed between colored layers of different colors, so that the contrast of the respective colors becomes clearer due to the boundaries being orderly partitioned.

In this case, areas of regions of the colored layers may be set separately by changing widths of the boundary layers. The colored layers may be formed by droplets of predetermined solutions expelled by an expelling apparatus. With this construction, by merely changing the widths of the boundary layers, it is possible to change the sizes of the colored layers without affecting the formation of other parts, so that it is easy to make balance adjustments, such as by reducing the regions of the colored layers of colors that are easily visible. Also, by forming the colored layers using an expelling apparatus, it is possible to uniformly apply the droplets to the colored layers surrounded by the boundary layers, so that it is possible to form the colored layers with no variation in the thickness of application and application ranges.

Another color filter according to an exemplary aspect of the present invention includes: a substrate that transmits light; a reflective layer that is formed on the substrate and includes openings; boundary layers formed on part of the reflective layer; a plurality of colored layers surrounded by the boundary layers; and an overcoat layer formed so as to cover the boundary layers and the colored layers. A surface of the reflective layer on which the boundary layers are formed has a convex and concave form that diffuses light. The boundary layers that are positioned between colored layers of a same color transmit light and the boundary layers that are positioned between colored layers of different colors do not transmit light.

With this construction, since the reflective surface has a convex and concave form, light is diffused and reflected, so that the formation of images from an incident light direction, such as a reflection of the eyes and face of someone looking at the display, can be reduced or prevented.

In this case, areas of regions of the colored layers may be set separately by changing widths of the boundary layers. The colored layers may be formed using droplets of predetermined solutions expelled by an expelling apparatus.

Also, the overcoat layer may be formed so that a thickness in a region corresponding to the reflective layer is thicker than a thickness of other parts. With this construction, the thickness of a liquid crystal part is reduced by an amount corresponding to an increase in the thickness of the overcoat layer in a region corresponding to the reflective layer. So a drop in brightness that occurs when reflected light, from the boundary layers that transmit light and the colored layers, passes the liquid crystal part, is suppressed and a brighter display can be achieved.

A method of manufacturing a color filter according to an exemplary aspect of the present invention includes: forming a reflective layer including openings on a substrate that transmits light; forming boundary layers on parts of the reflective layer so that boundary layers that transmit light are formed on a first region on the reflective layer and boundary layers that do not transmit light are formed on a second region on the reflective layer that differs to the first region; and forming a plurality of colored layers that are surrounded by the boundary layers so that the boundary layers that transmit light are present between colored layers of a same color and the boundary layers that do not transmit light are present between colored layers of different colors. Here, areas of regions of the colored layers may be set separately by changing widths of the boundary layers in the forming the boundary layers, and the forming the colored layers may form the colored layers using droplets of predetermined solutions expelled by an expelling apparatus.

Another method of manufacturing a color filter according to an exemplary aspect of the present invention includes: forming a reflective layer including openings on a substrate that transmits light; forming boundary layers on parts of the reflective layer so that boundary layers that transmit light are formed on a first region on the reflective layer and boundary layers that do not transmit light are formed on a second region on the reflective layer that differs to the first region; forming a plurality of colored layers that are surrounded by the boundary layers; and forming an overcoat layer so as to cover the boundary layers and the colored layers. A surface of the reflective layer on which the boundary layers are formed has a concave and convex form that diffuses light. Also, the forming the boundary layers may include forming boundary layers that transmit light between regions where color layers of a same color are to be formed and forming boundary layers that do not transmit light between regions where color layers of different colors are to be formed. Areas of regions of the colored layers may be set separately by changing widths of the boundary layers in the forming the boundary layers. In addition, the forming the colored layers may form the colored layers using droplets of predetermined solutions expelled by an expelling apparatus.

A display apparatus according to an exemplary aspect of the present invention includes: a substrate that transmits light; a reflective layer that is formed on the substrate and includes openings; boundary layers formed on part of the reflective layer; and a plurality of colored layers surrounded by the boundary layers. The boundary layers that are positioned between colored layers of a same color transmit light and the boundary layers that are positioned between colored layers of different colors do not transmit light. In this case, areas of regions of the colored layers may be set separately by changing widths of the boundary layers. The colored layers may be formed using droplets of predetermined solutions expelled by an expelling apparatus.

Another display apparatus according to an exemplary aspect of the present invention includes: a substrate that transmits light; a reflective layer that is formed on the substrate and includes openings; boundary layers formed on part of the reflective layer; a plurality of colored layers surrounded by the boundary layers; and an overcoat layer formed so as to cover the boundary layers and the colored layers. A surface of the reflective layer on which the boundary layers are formed has a convex and concave form that diffuses light. The boundary layers that are positioned between colored layers of a same color transmit light and the boundary layers that are positioned between colored layers of different colors do not transmit light.

In this case, areas of regions of the colored layers may be set separately by changing widths of the boundary layers. Also, the colored layers may be formed by droplets of predetermined solutions expelled by an expelling apparatus. The overcoat layer may be formed so that a thickness in a region corresponding to the reflective layer is thicker than a thickness of other parts.

An electro-optical apparatus according to an exemplary aspect of the present invention includes a color filter unit including colored layers surrounded by a boundary layer including a part that is uncolored; and an organic EL unit including separate light sources corresponding to the respective color layers. With this construction, an electro-optical apparatus with favorable visibility is obtained by bright organic EL light that passes the uncolored boundary layers and a power-saving light source with no waste where only organic EL parts corresponding to color layers of intended colors emit light.

The electronic appliance according to an exemplary aspect of the present invention is equipped with the above color filter, display apparatus, or electro-optical apparatus. With this construction, it is possible to realize various kinds of electronic appliance, such as a mobile telephone, a wristwatch, an electronic dictionary, a mobile gaming device, and a portable TV set. Such appliances using the exemplary aspects of the present invention have a clear display apparatus with enhanced color contrast and brightness.

With the color filter according to an exemplary aspect of the present invention, the respective colored layers are regularly partitioned by boundary layers that transmit light and boundary layers that do not transmit light, so that bright reflected light is obtained from the boundary layers that reflect light, which enhances the brightness of the display, and the boundary layers that do not transmit light clearly define the boundaries between the colored layers, thereby enhancing the contrast.

DETAILED DESCRIPTION OF EXEMPLARY EMBODIMENTS

An exemplary embodiment of a liquid crystal display apparatus that is a display apparatus equipped with a color filter according to an exemplary aspect of the present invention will now be described with reference to the attached drawings. This liquid crystal display apparatus is a so-called "transflective liquid crystal display" that has both a reflective-type display, on which external light is incident and which displays an image using reflected light for the incident light, and a transmissive-type display, which displays an image using light from a backlight, and is a power saving device that uses an optimal display method for the peripheral brightness. The liquid crystal display apparatus has a color filter with colored layers to display images in color.

First Exemplary Embodiment

Figure 1:
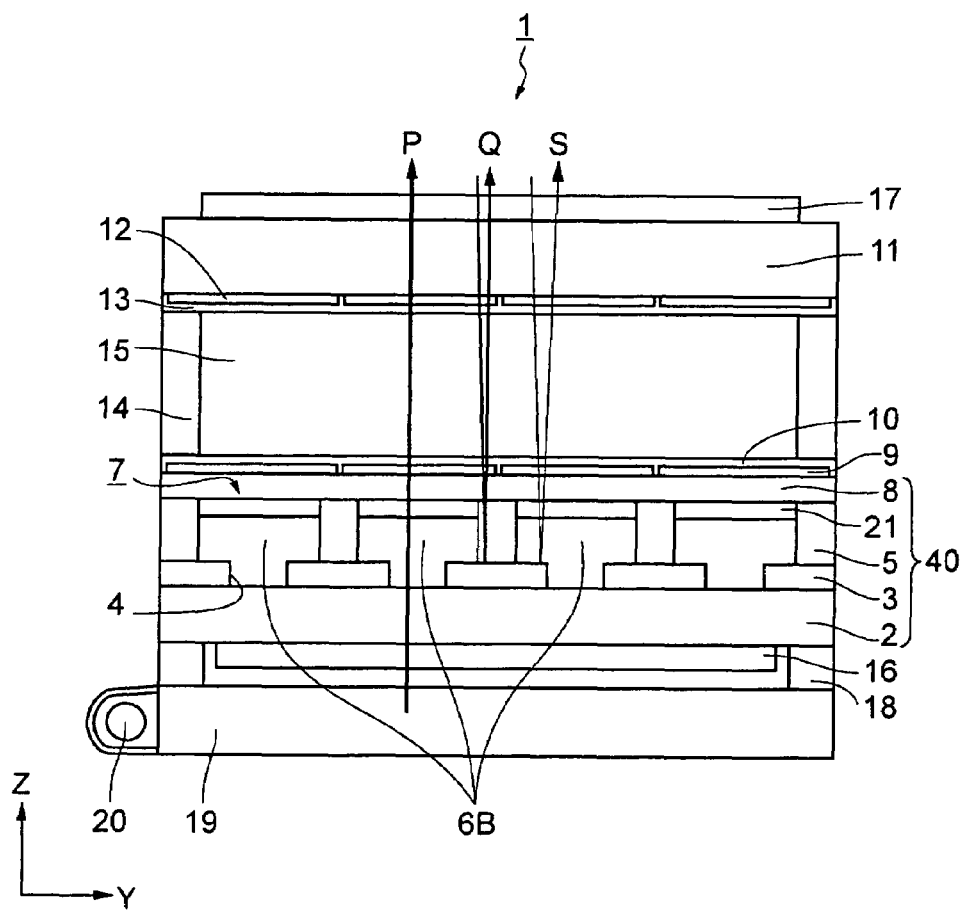
FIG. 1 is a schematic showing a transflective liquid crystal display apparatus according to a first exemplary embodiment of the present invention.
Figure 2A:
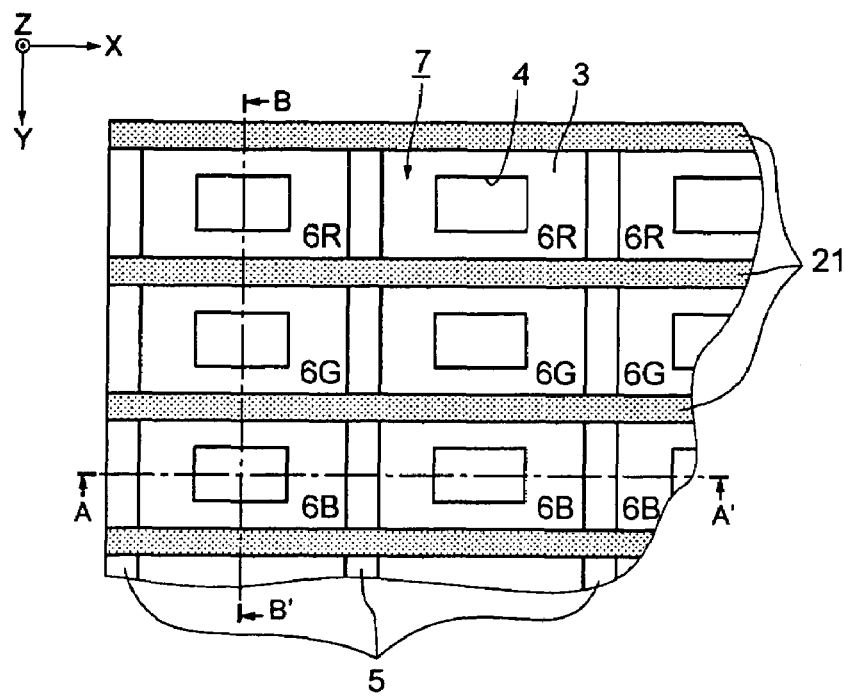
FIG. 2A is a schematic showing the arrangement of boundary layers in the transflective liquid crystal display apparatus.
Figure 3:
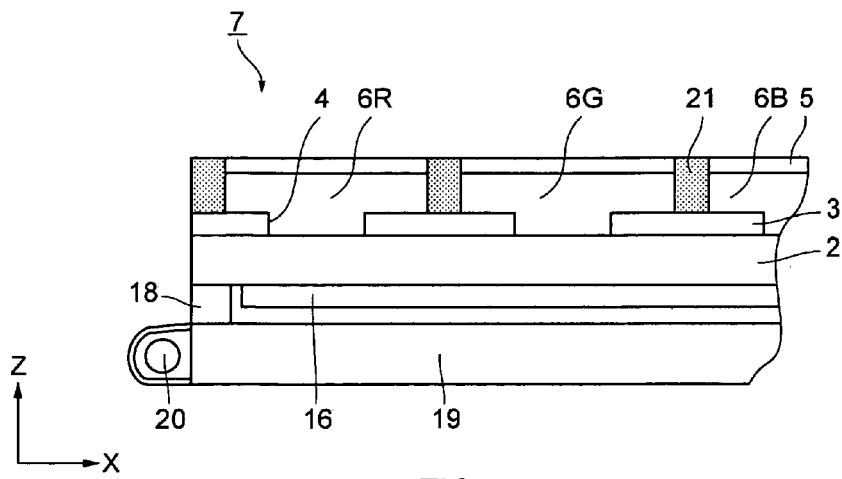
FIG. 3 is a schematic of a periphery of the colored boundary layer.

FIG. 1 is a schematic of the transflective liquid crystal display apparatus according to the present invention. In this schematic, the side on which a light source (backlight) 20 is disposed with respect to liquid crystals 15 is called the "rear surface-side", and the opposite side is called the "front surface-side". Normally, the display content is viewed from the front surface-side. FIG. 2A shows the arrangement of boundary layers that are a principal part of an exemplary aspect of the present invention when looking from the front surface-side. A plurality of colored boundary layers 21 that do not transmit light and extend in an X-axis direction and a plurality of uncolored boundary layers 5 that transmit light and extend in a Y-axis direction, perpendicular to the X-axis, are formed in a lattice. FIG. 1 shows a cross-section (A-A') of an uncolored boundary layer 5. FIG. 3 shows a cross-section (B-B') of a colored boundary layer 21.

As shown in FIG. 1 and FIG. 2A, the transflective liquid crystal display apparatus 1 includes a color filter 40 to display color images, the color filter 40 including a rear surface substrate 2 and a front surface substrate 11 that both transmit light and are disposed facing each other, a reflective layer 3 that has openings 4 formed in the front surface-side of the front surface-side of the rear surface substrate 2, the uncolored boundary layers 5 and the colored boundary layers 21 that are formed so as to surround the openings 4 on the reflective layer 3, a plurality of sprayed parts 7 that are formed by the uncolored boundary layers 5 and the colored boundary layers 21 and on which colored liquids, which are predetermined solutions, are applied by an expelling apparatus described later, colored layers 6R, 6G, 6B that are layers of the colored liquids applied onto the respective sprayed parts 7, and an overcoat layer 8 that covers one surface of the uncolored boundary layers 5, the colored boundary layers 21, and the colored layers 6R, 6G, and 6B.

Pixel electrodes 12 arranged corresponding to the colored layers 6R, 6G, and 6B and an oriented film 13 that covers the pixel electrodes 12 are formed on the rear surface-side of the front surface substrate 11. Counter electrodes 9 that are disposed corresponding to the pixel electrodes 12 and an oriented film 10 that covers the counter electrodes 9 are formed on the overcoat layer 8. A sealing material 14 is formed between the oriented film 10 and the oriented film 13 so as to trace an outer circumferential part of the front surface substrate. The liquid crystals 15 are sealed in the space formed by the sealing material 14, the oriented film 10, and the oriented film 13. In addition, the transflective liquid crystal display apparatus 1 includes a front surface polarizing plate 17 stuck onto the front surface side of the front surface substrate 11, a rear surface polarizing plate 16 stuck onto the rear surface side of the rear surface substrate 2, an optical waveguide 19 provided via a cushioning material 18 so as to cover the entire rear surface side of the rear surface polarizing plate 16, and the light source 20 that supplies light to the optical waveguide 19.

It should be noted that the colored layers 6R, 6G, and 6B are regularly disposed in a lattice. Colored layers 6 of the same colors form rows in the X-axis direction. Colored layers 6R, 6G, and 6B of different colors are disposed in that order in the Y-axis direction. The colored boundary layers 21 are positioned at boundaries between the colored layers 6 of different colors. The uncolored boundary layers 5 are positioned at boundaries between the colored layers 6 of the same color. These colored layers 6 are partitioned by the boundary layers 5, 21 so that it is possible to present a clear display without deterioration in the contrast and the like of colors, due to overlapping of different colors and the production of gaps. The uncolored boundary layers 5, the counter electrodes 9, the pixel electrodes 12, the oriented films 10, 13 and the overcoat layer 8 all transmit light.

Reflective display by the transflective liquid crystal display apparatus 1 of the above construction will now be described. Out of the external light Q, S incident on the front surface polarizing plate 17, only light with the orientation (the transmission axis orientation) transmitted by the front surface polarizing plate 17 passes through. Light with other orientations is absorbed by the front surface polarizing plate 17. The external light Q, S, that has passed the front surface polarizing plate 17, is incident on a path composed of the front surface substrate 11→the pixel electrodes 12→the oriented film 13→the liquid crystals 15→the oriented film 10→the counter electrodes 9→the overcoat layer 8, with the external light S passing through one of the colored layers 6R, 6G, and 6B and reaching the reflective layer 3, being reflected by the reflective layer 3, and passing back through the colored layers 6 to become colored light of the respective colors of the colored layers 6 that is emitted along the inverse of the incident path to the front surface side. The external light Q that, is incident on the uncolored boundary layers 5, passes through the uncolored boundary layers 5 to reach the reflective layer 3, is reflected by the reflective layer 3, passes back through the uncolored boundary layers 5 and is emitted along the inverse of the incident path towards the front surface side as uncolored light. The external light Q incident on the colored boundary layers 21 is absorbed by the colored boundary layers 21.

The external light S, that is colored light, passes through the colored layers 6 twice and so is colored to predetermined colors and color depths. But light of colors aside from such colors is absorbed by the colored layers 6, resulting in a drop in luminance. If the layer thickness of the colored layers 6 is increased with the intention of raising the color depths, there tends to be a greater drop in luminance. However, the uncolored external light Q does not pass through the colored layers 6 and passes through the uncolored boundary layers 5, and so is emitted in a bright state. For this reason, to increase the luminance of the external light S, the external light Q and the external light S are simultaneously emitted from the front surface, so that the overall luminance is maintained by a synergistic effect. This light, whose luminance has increased by mixing the colored light and uncolored light, cannot be split into the colored light and the uncolored light by the human eye and so both components are recognized as colored light.

The uncolored boundary layers 5 that have this effect are composed of acrylic resin or epoxy resin that favorably transmit light. Since the uncolored boundary layers 5 are regularly formed at the boundaries between the colored layers 6 of the same colors, a clear display with favorable balance between the overall luminances of the respective colored layers 6 is achieved. The colored boundary layers 21 are made of resin, are formed at the boundaries between the colored layers 6 of the different colors, and are black. The colored boundary layers 21 orderly partition the boundaries of the colored layers 6 to produce a favorable contrast for colors. During the formation of the colored layers 6 by an expelling apparatus described later, even if colored liquids are expelled onto the colored boundary layers 21, such liquids have no effect on the display of images. So there is an advantage that the expelling of the colored liquid can be carried out easily onto the boundary parts of different colors that are adjacent. Both types of boundary layers are normally formed using a dispenser or by screen printing.

Figure 2B:
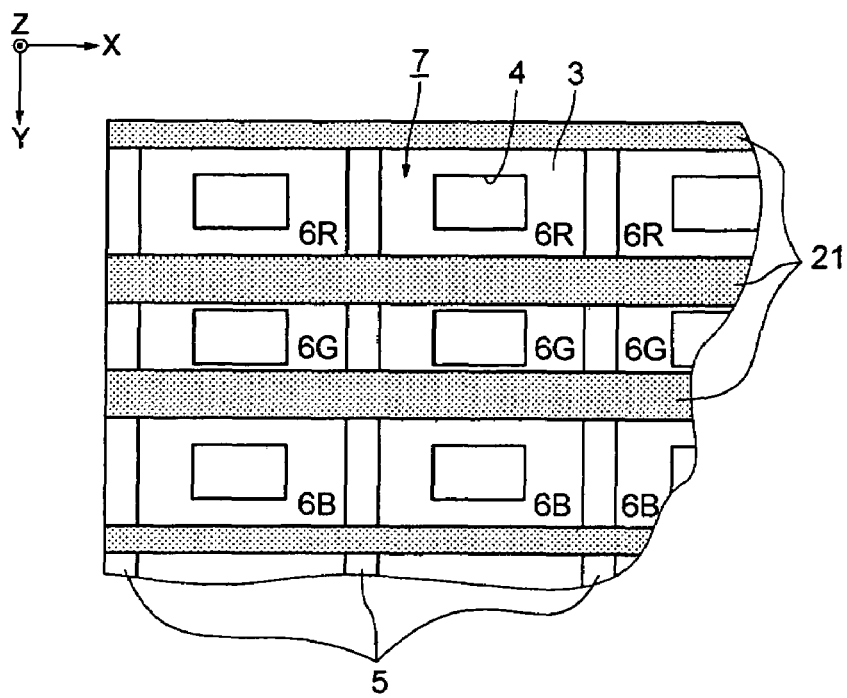
FIG. 2B is a schematic showing the arrangement of boundary layers that make the green colored layers narrow.

Out of the colored light that has passed through the colored layers 6R, 6G, and 6B, the green light is more visible to the human eye than the red light and the blue light. Even if the regions of the green colored layers 6G are narrowed as shown in FIG. 2B, the colored light that passes the green colored layers 6G will be viewed by the human eye in the same way as the colored light of other colors, so that the viewer will not feel that the display of green is insufficiently bright or that the color balance is poor. The adjustment of the regions of the green colored layers 6G can be easily carried out by widening the colored boundary layers 21 that are adjacent to the green colored layers 6G by extending such layers 21 on the green colored layer 6G-side and reducing the amount of green colored liquid used. It is also possible to easily adjust the balance of colors aside from green in the same way.

To reflect light, a thin film of silver, aluminum, nickel, chromium, or the like, is used as the reflective layer 3 formed above the rear surface substrate 2. The overcoat layer 8 flattens out the convexes and concaves caused by the formation by the uncolored boundary layers 5, the colored boundary layers 21, and the colored layers 6R, 6G, and 6B and so facilitates the formation of the counter electrodes 9. The oriented films 10, 13 respectively cover and protect the counter electrodes 9 and the pixel electrodes 12, and protect against deterioration of the liquid crystals 15 due to the exuding of organic material and the like.

The liquid crystals 15 are controlled in accordance with an electric field formed between the counter electrodes 9 and the pixel electrodes 12 that are provided on both sides of the liquid crystals 15 so that the light that passes through the liquid crystals 15 can be controlled by changing the orientation of the liquid crystal molecules. Accordingly, the counter electrodes 9 and the pixel electrodes 12 are arranged in pairs at opposing positions corresponding to the colored layers 6R, 6G, and 6B, and a predetermined display is produced by controlling the transmission and shutting out of light, and the luminance of the respective colors. In each uncolored boundary layer 5 region, respective counter electrodes 9 that are adjacent on both sides of the uncolored boundary layer 5 are disposed so as to each cover half of the width of the uncolored boundary layer 5. That is, the external light Q and the external light S are controlled in the same way in each of the respective regions where the counter electrodes 9 and the pixel electrodes 12 are paired so that the light is transmitted or shut out. It should be noted that the external light Q, S passes the liquid crystals 15 twice.

Next, transmissive-type display will be described in brief. During transmissive-type display, unlike the reflective-type display, transmitted light P emitted from the light source 20 is used instead of the external light Q, S. The transmitted light P is guided by the optical waveguide 19 to the rear surface polarizing plate 16. Only the light in the orientation transmitted by the rear surface polarizing plate 16 (the transmission axis orientation) passes through the rear surface polarizing plate 16, also passes through the rear surface substrate 2, and becomes incident on the colored layers 6R, 6G, and 6B from the openings 4. The transmitted light P incident on the colored layers 6R, 6G, and 6B is colored to the respective colors of the colored layers 6 on which the light is incident and passes on a path composed of the overcoat layer 8→the counter electrodes 9→the oriented film 10→the liquid crystals 15→the oriented film 13→the pixel electrodes 12→the front surface substrate 11→the front surface polarizing plate 17 and so is emitted to the front surface side. Since the transmitted light P normally only passes through the colored layers 6 and the liquid crystals 15 once, if the transmitted light P, from the light source 20, is set at the same luminance as the external light S incident from the front surface, when the respective light is emitted from the front surface, the transmitted light P will be brighter than the external light S. An exemplary aspect of the present invention adds the bright external light Q to the external light S to increase the luminance of a reflective-type display, so that the difference in luminance with the transmissive-type display becomes extremely small.

Second Exemplary Embodiment

Figure 4:
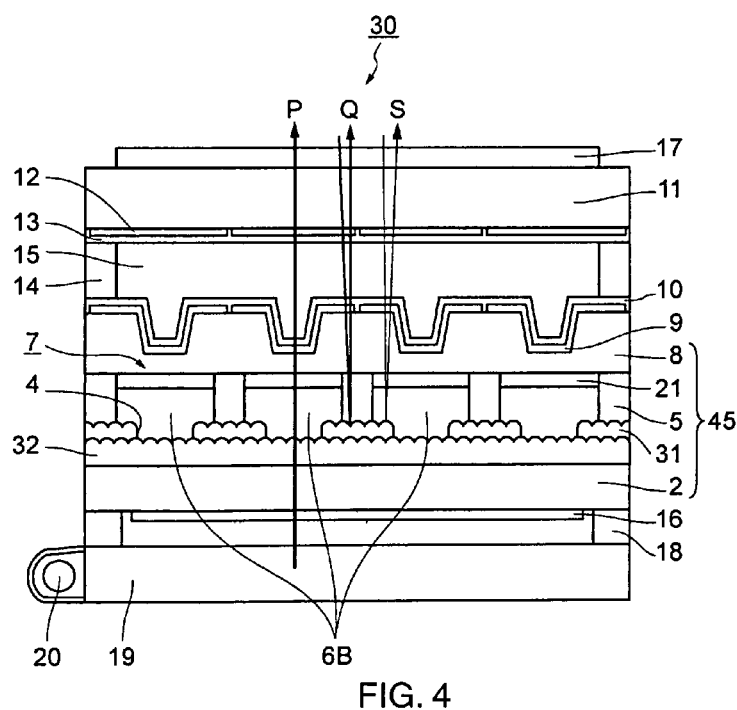
FIG. 4 is a schematic showing a transflective liquid crystal display apparatus according to a second exemplary embodiment of the present invention.

Next, a second exemplary embodiment of the present invention will be described. FIG. 4 is a schematic showing a transflective liquid crystal display apparatus 30 according to the second exemplary embodiment. In the same way as in the first exemplary embodiment, in this schematic, the side on which a light source 20 is disposed with respect to liquid crystals 15 is called the "rear surface-side", and the opposite side is called the "front surface-side". As shown in FIG. 2, the boundary layers are arranged so that a plurality of colored boundary layers 21 extending in the X-axis direction and a plurality of uncolored boundary layers 5 extending in the Y-axis direction, that is perpendicular to the X-axis, are formed in a lattice. FIG. 4 shows a cross-section (A-A') of an uncolored boundary layer 5, while FIG. 5 shows a cross-section (B-B') of a colored boundary layer 21.

Figure 5:
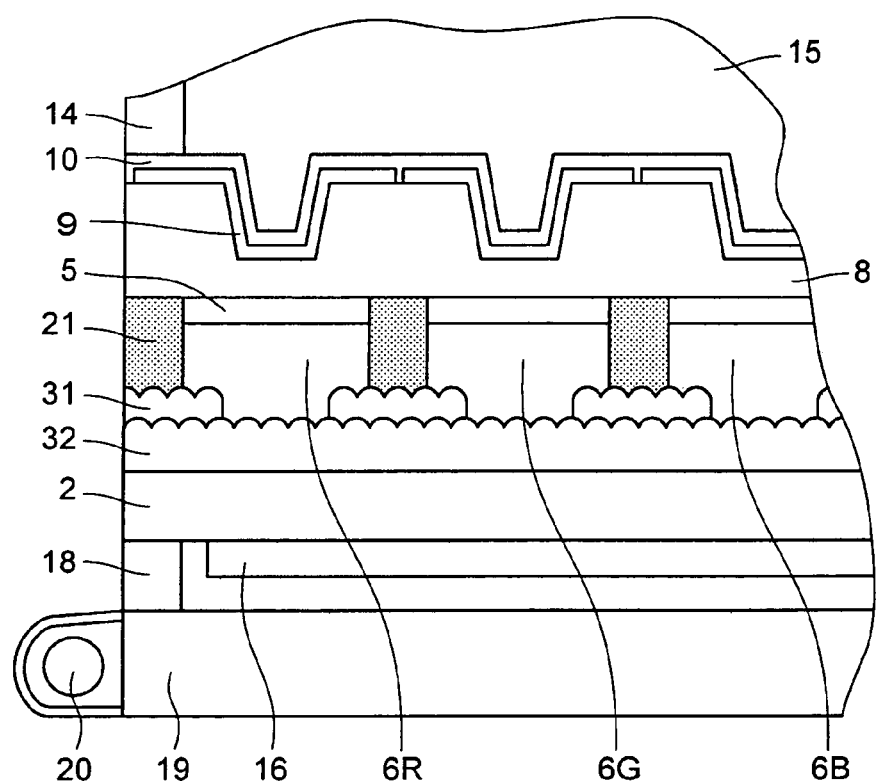
FIG. 5 is a schematic view of the colored parts of the second exemplary embodiment.

As shown in FIGS. 4 and 5, the transflective liquid crystal display apparatus 30 includes a color filter 45 to display color images, the color filter 45 including the rear surface substrate 2 and the front surface substrate 11 that both transmit light and are disposed facing each other, a resin diffusing layer 32 that is formed on the front surface side of the rear surface substrate 2 and is provided with convexes and concaves on the front surface side surface thereof, a diffusing reflective layer 31 that is formed on the resin diffusing layer 32 and has the openings 4 and a convex/concave surface that diffuses light on the front surface side surface thereof, uncolored boundary layers 5 and colored boundary layers 21 that are formed on the diffusing reflective layer 31 so as to surround the openings 4, a plurality of sprayed parts 7 that are formed by the uncolored boundary layers 5 and the colored boundary layers 21 and onto which predetermined colored liquids are applied by an expelling apparatus described later, colored layers 6R, 6G, and 6B that are layers of the colored liquids applied onto the respective sprayed parts 7, and an overcoat layer 8 that covers one surface of the uncolored boundary layers 5, the colored boundary layers 21, and the colored layers 6R, 6G, and 6B and whose parts corresponding to the diffusing reflective layer 31 are thickly formed.

Pixel electrodes 12, arranged corresponding to the colored layers 6R, 6G, and 6B and an oriented film 13 that covers the pixel electrodes 12, are formed on the rear surface side of the front surface substrate 11. Counter electrodes 9, that are disposed in concave parts corresponding to the pixel electrodes 12 and an oriented film 10 that covers the counter electrodes 9, are formed on the overcoat layer 8 mentioned above. A sealing material 14 is formed between the oriented film 10 and the oriented film 13 so as to trace the outer circumferential part of the front surface substrate 11, and the liquid crystals 15 are sealed in the space produced by the sealing material 14, the oriented film 10, and the oriented film 13. In addition, the transflective liquid crystal display apparatus 30 includes a front surface polarizing plate 17 stuck onto the front surface side of the front surface substrate 11, a rear surface polarizing plate 16 stuck onto the rear surface side of the rear surface substrate 2, an optical waveguide 19 provided via a cushioning material 18 so as to cover the entire surface of the rear surface polarizing plate 16, and a light source 20 that supplies light to the optical waveguide 19.

It should be noted that the colored layers 6R, 6G, and 6B are regularly disposed in a lattice, with colored layers 6 of the same colors forming rows in the X-axis direction. Colored layers 6R, 6G, and 6B of different colors are disposed in that order in the Y-axis direction. The colored boundary layers 21 are positioned at boundaries between the colored layers 6 of different colors. The uncolored boundary layers 5 are positioned at boundaries between the colored layers 6 of the same color. The uncolored boundary layers 5, the counter electrodes 9, the pixel electrodes 12, the oriented films 10, 13, the overcoat layer 8, and the resin diffusing layer 32 all transmit light. The differences with the first exemplary embodiment lie in the additional provision of the resin diffusing layer 32, the formation of convexes and concaves in the reflective layer 3 to produce the diffusing reflective layer 31, and in the variation in the thickness of parts of the overcoat layer 8.

When carrying out reflective-type display by the transflective liquid crystal display apparatus 30 constructed in this way, out of the external light Q, S, incident on the front surface polarizing plate 17, only the light with the orientation (the transmission axis orientation) transmitted by the front surface polarizing plate 17 passes through and is incident on a path composed of the front surface substrate 11→the pixel electrodes 12→the oriented film 13→the liquid crystals 15→the oriented film 10→the counter electrodes 9→and the overcoat layer 8, with the external light S passing through one of the colored layers 6R, 6G, and 6B and reaching the diffusing reflective layer 31, being reflected by the diffusing reflective layer 31, and passing back through the colored layers 6 to become colored light of the respective colors of the colored layers 6 that is emitted along the inverse of the incident path to the front surface side. The external light Q, incident on the uncolored boundary layers 5, passes through the uncolored boundary layers 5 to reach the diffusing reflective layer 31, is reflected by the diffusing reflective layer 31, and passes back through the uncolored boundary layers 5 and is emitted towards the front surface side via the inverse of the incident path as uncolored light. The external light Q incident on the colored boundary layers 21 is absorbed by the colored boundary layers 21.

When the external light Q, S is reflected by the diffusing reflective layer 31, the convexes and concaves in the surface of the diffusing reflective layer 31 diffuse the light in various directions. As a result, it is possible to reduce the likelihood or prevent an image of the user's eyes or face, etc., being formed on the front surface as would happen if convexes and concaves were not provided, so that a clearer display is achieved. To reflect light, a thin film of silver, aluminum, nickel, chromium, or the like is used as the diffusing reflective layer 31 and convexes and concaves to diffuse light are provided in the surface by an oxygen plasma treatment or the like. In addition, although external light incident on the openings 4 is hardly reflected, to make the display bright while reducing the likelihood or preventing even faint reflected images from being formed, convexes and concaves are also formed in the front surface-side surface of the resin diffusing layer 32.

The external light S that is colored light passes through the colored layers 6 twice and so is colored to predetermined colors and color depths, although there is a drop in luminance. The uncolored external light Q does not pass through the colored layers 6 and passes through the uncolored boundary layer 5, and so is emitted in a bright state. For this reason, the external light Q and the external light S are simultaneously emitted from the front surface, so that the overall luminance is maintained. The uncolored boundary layers 5 that have this effect are composed of acrylic resin or epoxy resin that favorably transmit light. Since the uncolored boundary layers 5 are regularly formed at the boundaries between the colored layers 6 of the same colors, a clear display with favorable balance between the overall luminances of the respective colored layers 6 is achieved. The colored boundary layers 21 are made of resin, are formed at the boundaries between the colored layers 6 of the different colors, and are black. The colored boundary layers 21 orderly partition the boundaries of the colored layers 6 to produce a favorable contrast for colors. During the formation of the colored layers 6 by an expelling apparatus described later, even if the colored liquids are expelled onto the colored boundary layers 21, such liquids have no effect on the display of images. So there is the advantage that the expelling of the colored liquid can be carried out easily onto the boundary parts of different colors that are adjacent. Here, both types of boundary layers are normally formed using a dispenser or by screen printing.

Also, as green light is more visible to the human eye than red light and blue light, as shown in FIG. 2B, the colored boundary layers 21 are extended to make the green colored layers 6G narrower, thereby reducing or preventing visibility problems. Also, as shown in FIG. 4 and FIG. 5, to keep the external light Q, S reflected by the diffusing reflective layer 31 bright, only the parts of the overcoat layer 8 corresponding to the diffusing reflective layer 31 are thickly formed, so that the thicknesses of the liquid crystal 15 parts through which the external light Q, S reflected by the diffusing reflective layer 31 passes are set narrower than the thicknesses of other parts. By doing so, the drop in the brightness of the external light Q, S, due to the external light Q, S passing the liquid crystals 15, is suppressed and it is possible to enhance the brightness of the light emitted from the front surface.

Figure 13:
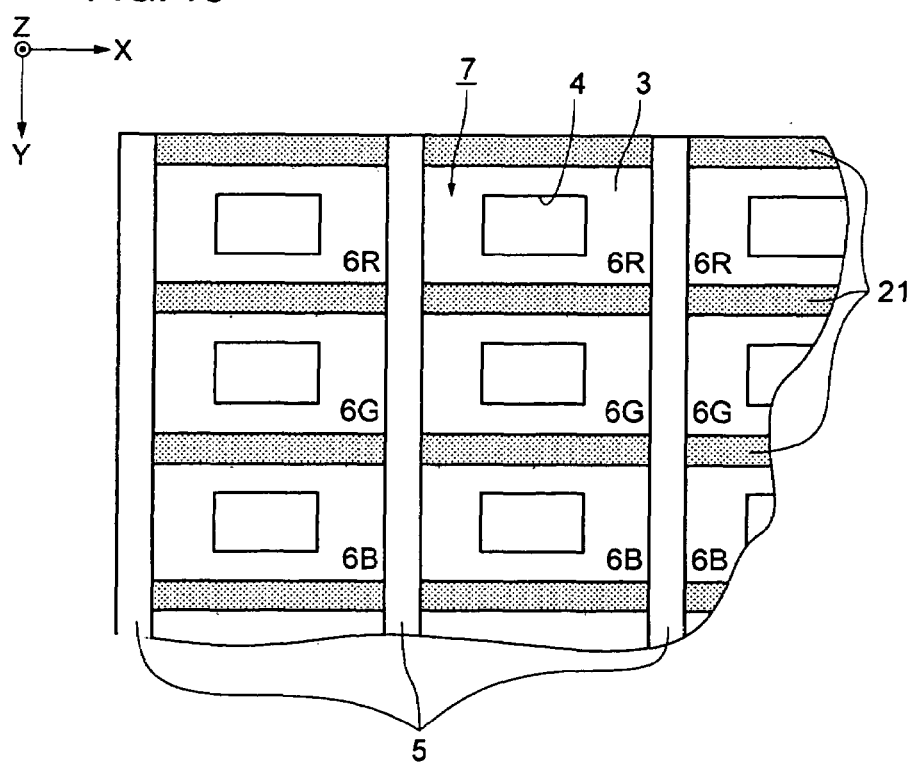
FIG. 13 is a schematic showing the arrangement of boundary layers in a transflective liquid crystal display apparatus.

It should be noted that regarding the arrangement of the uncolored boundary layers 5 and the colored boundary layers 21, instead of constructing the uncolored boundary layers 5 and the colored boundary layers 21 as shown in FIG. 2 so that the colored boundary layers 21 extend continuously in the X-axis direction and the uncolored boundary layers 5 extend intermittently in the Y-axis direction, it is also possible, as shown in FIG. 13, to use a construction where the colored boundary layers 21 extend intermittently in the X-axis direction and the uncolored boundary layers 5 extend continuously in the Y-axis direction.

The transmissive-type display is carried out in the same way as the transflective liquid crystal display apparatus 1 described earlier. As an additional feature, in this second embodiment the thickness of the liquid crystal 15 parts, through which the external light Q, S passes, are made narrower to suppress the drop in brightness. So if the transmitted light P from the light source 20 is set at the same brightness of the external light Q, S that is incident, with such a setting there is no difference between the transmitted light P and the combined light for the external light Q, S emitted from the front surface. The transflective liquid crystal display apparatus 30 is a display device with favorable display balance where a difference in brightness due to the paths passed by the transmitted light P and the external light Q, S is eradicated.

In the transflective liquid crystal display apparatuses 1, 30 described in the above first and second exemplary embodiments, to uniformly form the colored layers 6R, 6G, and 6B required for color display, it is possible to apply the color liquids by expelling the liquids in a droplet state onto the sprayed parts 7 using a droplet expelling apparatus. In this case, the overcoat layer 8 can also be formed by a droplet expelling apparatus.

Figure 6:
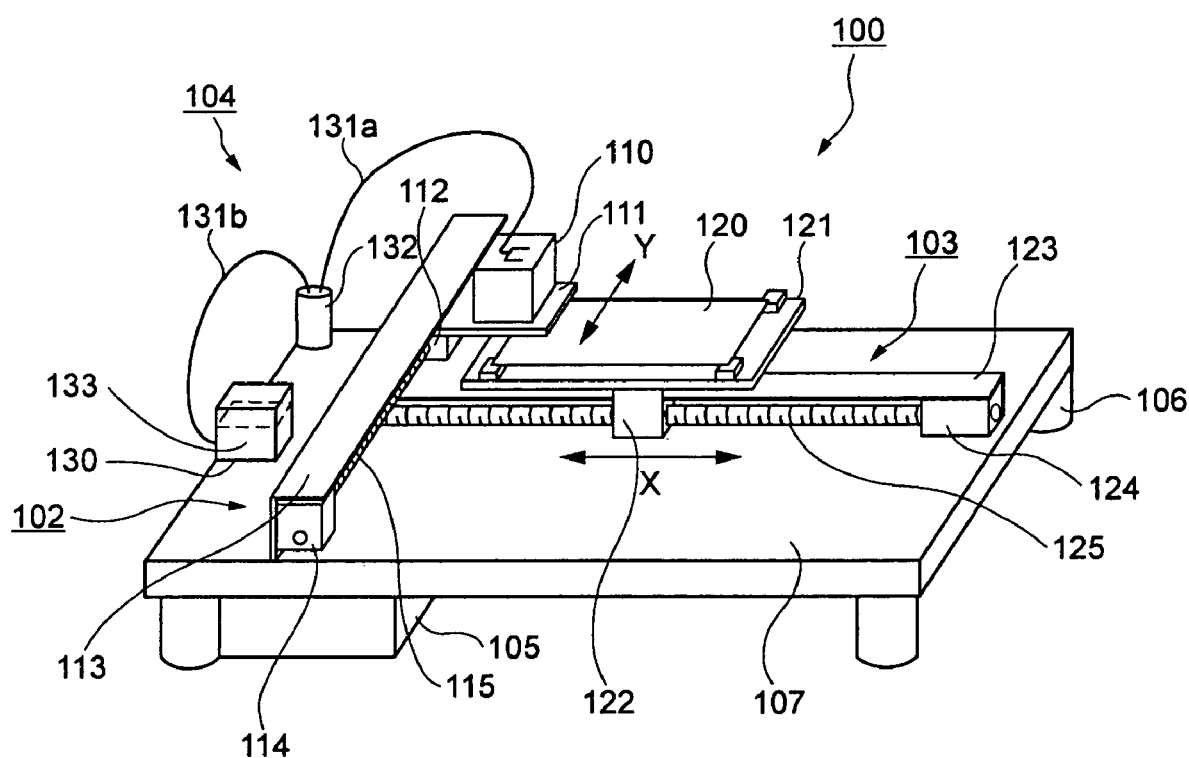
FIG. 6 is a schematic of a droplet expelling apparatus.

As shown in FIG. 6, a droplet expelling apparatus 100 includes a head mechanism unit 102 that has a head unit 110 to expel droplets, a work mechanism unit 103 equipped with a work 120 onto which droplets expelled from the head unit 110 are sprayed, a liquid supplying unit 104 that supplies a liquid 133 to the head unit 110, and a control unit 105 that carries out overall control of the mechanism units and the liquid supplying unit 104.

The droplet expelling apparatus 100 includes a plurality of support legs 106 set on the floor and a machine platen 107 set at the upper end of the support legs 106. The work mechanism unit 103 is arranged on the upper side of the machine platen 107 so as to extend in the longitudinal direction (the X-axis direction) of the machine platen 107. The head mechanism unit 102 is supported at both ends above the work mechanism unit 103 by two pillars that are fixed to the machine platen 107 and is disposed so as to extend in a direction (the Y-axis direction) perpendicular to the work mechanism unit 103. Also, the liquid supplying unit 104, that is connected to the head unit 110 of the head mechanism unit 102 and supplies a liquid 133, is disposed at one end of the machine platen 107. The control unit 105 is enclosed on a lower side of the machine platen 107.

The head mechanism unit 102 includes the head unit 110 that expels the liquid 133, a carriage 111 on which the head unit 110 is mounted, a Y-axis guide 113 that guides the movement of the carriage 111 in the Y-axis direction, a Y-axis ball screw 115 that is set in the Y-axis direction below the Y-axis guide 113, a Y-axis motor 114 that rotates the Y-axis ball screw 115 in forwards and in reverse, and a carriage engaging part 112 that is below the carriage 111 and in which a female threaded part that engages the Y-axis ball screw 115 and moves the carriage 111 is formed.

The work mechanism unit 103 is located below the head mechanism unit 102 and has almost the same construction as the head mechanism unit 102 but is disposed in the X-axis. The work mechanism unit 103 includes the work 120, the mounting 121 on which the work 120 is mounted, an X-axis guide 123 that guides movement of the mounting 121, an X-axis ball screw 125 set below the X-axis guide 123, an X-axis motor 124 that rotates the Y-axis ball screw 115 in forwards and in reverse, and a mounting engaging part 122 that is below the mounting 121, engages the X-axis ball screw 125, and moves the mounting 121.

It should be noted that although not shown, the head mechanism unit 102 and the work mechanism unit 103 are respectively equipped with a position detecting device that detect the positions to which the head unit 110 and the mounting 121 have moved. Mechanisms to adjust the rotation orientation (the so-called θ axis) are also incorporated on the carriage 111 and the mounting 121, so that it is possible to adjust the rotational orientation of the head unit 110 with the center of the head unit 110 as the center of rotation and also the rotational orientation of the mounting 121.

With these constructions, it is possible to freely move the head unit 110 and the work 120 reciprocally in the Y-axis direction and the X-axis direction, respectively. Movement of the head unit 110 will be described first. Due to rotation of the P-type well 114 in forwards and in reverse, the Y-axis ball screw 115 rotates in forwards and in reverse, so that the carriage engaging part 112 that engages the Y-axis ball screw 115 moves along the Y-axis guide 113 and the carriage 111 integrally provided with the carriage engaging part 112 is moved to a freely chosen position. By driving the Y-axis motor 114, the head unit 110 mounted on the carriage 111 is freely moved in the Y-axis direction. In the same way, the work 120 mounted on the mounting 121 is freely moved in the X-axis direction.

In this way, the head unit 110 is constructed so as to move as far as the expelling position in the Y-axis direction, to stop and to then expel droplets in synchronization with the movement in the X-axis direction of the work 120 below. Control is carried out alternately for the work 120 that moves in the X-axis direction and the head unit 110 that moves in the Y-axis direction, so that a predetermined plotting or the like can be carried out on the work 120.

Next, the liquid supplying unit 104 that supplies the liquid 133 to the head unit 110 includes a tube 131*a* that forms a flow channel to connect to the head unit 110, a pump 132 that pumps the liquid 133 to the tube 131*a*, a tube 131*b* (flow channel) that supplies the liquid 133 to the pump 132, and a tank 130 that is connected to the tube 131*b* and stores the liquid 133. The tank 130 is disposed on the machine platen 107 at one end. In view of the replenishing and replacement of the liquid 133, the tank 130 may be disposed on an upper surface of the machine platen 107 or below the machine platen 107. But if the tank 130 can be arranged so as to be set above the head unit 110, the tank 130 and the head unit 110 can be connected with a single flexible tube without the pump 132 and the liquid 133 can be supplied naturally by gravity.

Figure 7A:
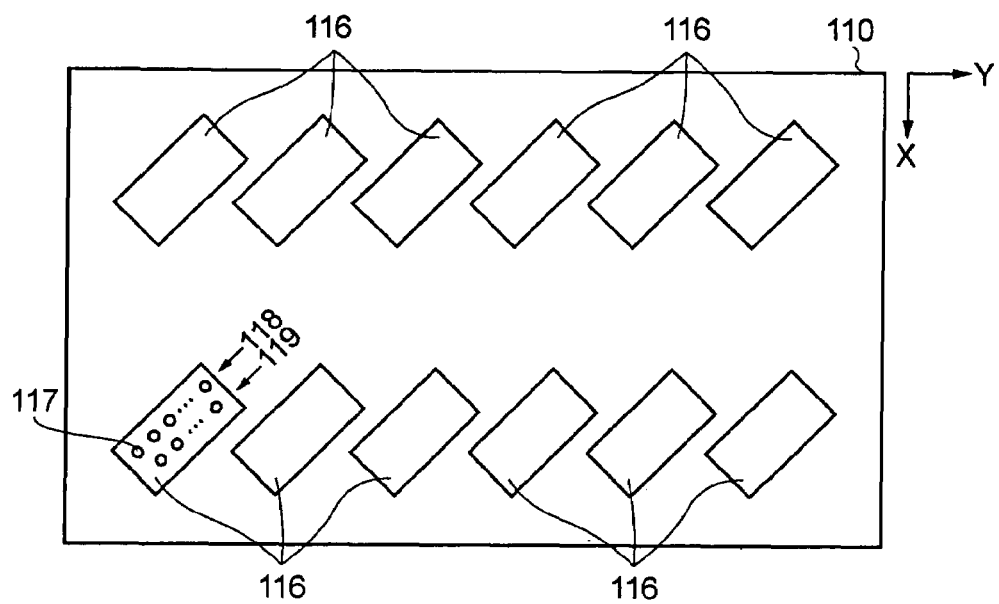
FIG. 7A is a schematic showing the arrangement of expulsion heads and nozzles.

As shown in FIG. 7A, the head unit 110 has a plurality of expulsion heads 116 of the same construction. FIG. 7A is a view of the head unit 110 when looking from the mounting 121 side. On the head unit 110, two rows composed of six expulsion heads 116 are disposed so that the longitudinal directions of the respective expulsion heads 116 are angled with respect to the X-axis direction. In addition, the expulsion heads 116 to expel the liquid 133 respectively include two nozzle rows 118 and 119 that extend in the longitudinal direction of the expulsion heads 116. In each of these nozzle rows, 180 nozzles 117 are arranged in a line, with the gap between the nozzles 117 in the directions of the nozzle rows 118, 119 being around 140 μm. The nozzles 117 are disposed so as to be displaced by one half pitch (around 70 μm) between the two nozzle rows 118, 119.

Figure 7B:
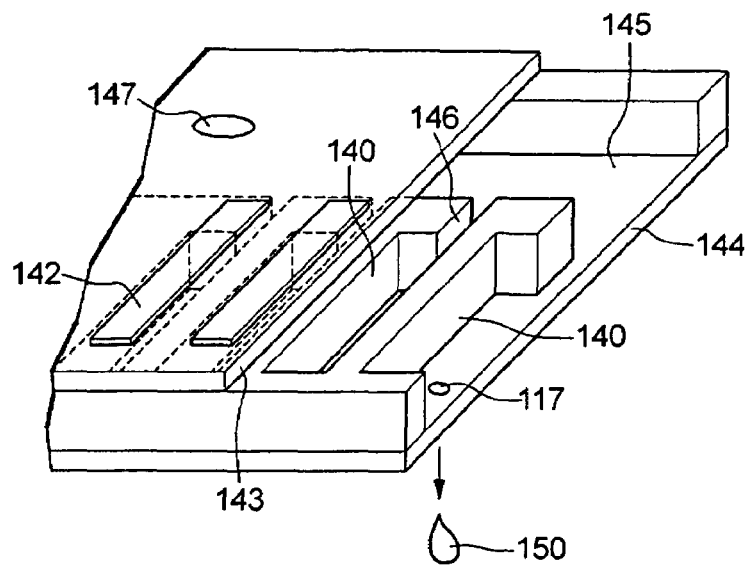
FIG. 7B is a schematic showing the construction of the expulsion heads.

As shown in FIG. 7B, the respective expulsion heads 116 are equipped with a diaphragm 143 and a nozzle plate 144. A reservoir 145 that is always filled with the liquid 133 supplied from the tank 130 via a hole 147 is positioned between the diaphragm 143 and the nozzle plate 144. Also, a plurality of partitions 141 are disposed between the diaphragm 143 and the nozzle plate 144. Each part surrounded by the diaphragm 143, the nozzle plate 144 and a pair of the partitions 141 is a cavity 140. Each cavity 140 is provided opposite a nozzle 117, so that there is an equal number of the cavities 140 and the nozzles 117. The liquid 133 is supplied from the reservoir 145 via a supply opening 146 positioned between a pair of partitions 141 into a cavity 140.

Figure 8:
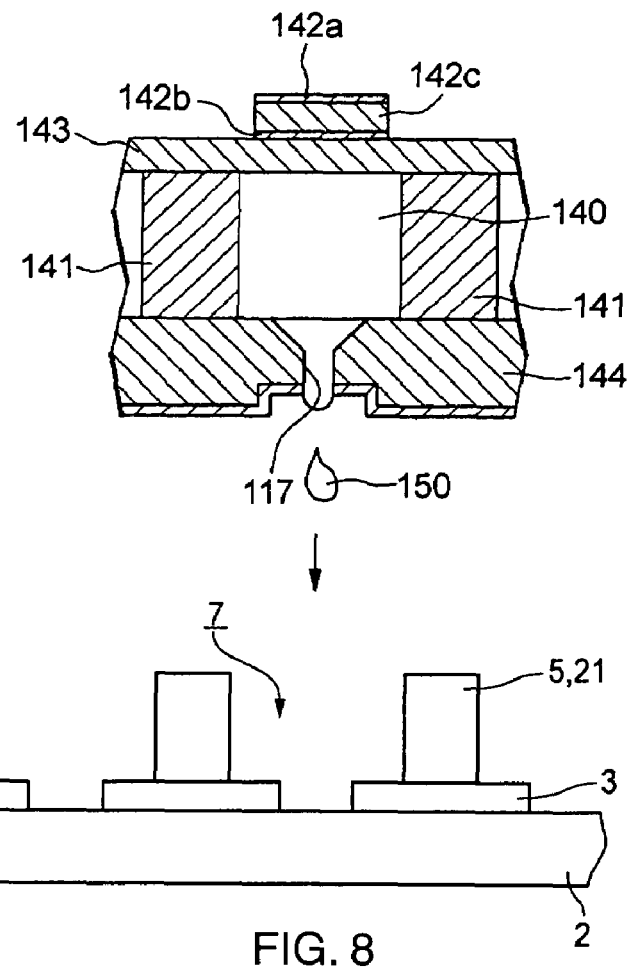
FIG. 8 is a schematic showing a state where droplets are expelled onto the colored parts.

As shown in FIG. 8, corresponding to the respective cavities 140, oscillators 142 are disposed on the diaphragm 143. Each oscillator 142 is composed of a piezo element 142*c*, and a pair of electrodes 142*a*, 142*b* that sandwich the piezo element 142*c*. By applying a driving voltage to the pair of electrodes 142*a*, 142*b*, the liquid 133 is expelled from the corresponding nozzle 117 as droplets 150. In the case of the transflective liquid crystal display apparatuses 1, 30, droplets 150 of colored liquids are expelled onto the sprayed parts 7 that are surrounded by the uncolored boundary layers 5 and the colored boundary layers 21 to form the colored layers 6R, 6G, and 6B.

Figure 10:
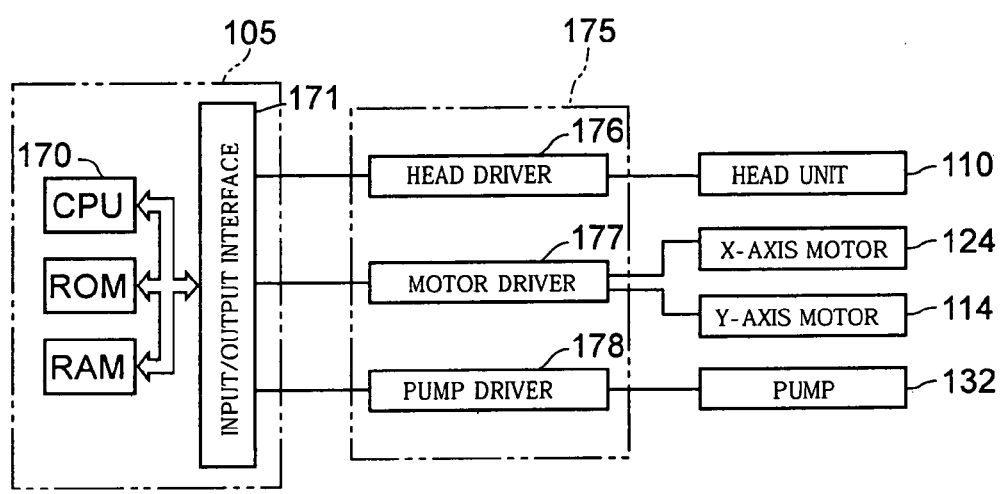
FIG. 10 is a schematic showing a control system of a droplet expelling apparatus.

Next, a control system that controls the construction described above will be described with reference to FIG. 10. The control system includes the control unit 105 and a driving unit 175. The control unit 105 is composed of a CPU 170, a ROM, a RAM, and an input/output interface 171, with the CPU 170 processing various signals inputted via the input/output interface 171 based on the data in the ROM and RAM and outputting control signals to the driving unit 175 via the input/output interface 171 to carry out control a head driver 176, a motor driver 177, and a pump driver 178.

The driving unit 175 includes a head driver 176, a motor driver 177, and a pump driver 178. The motor driver 177 rotates the X-axis motor 124 and the Y-axis motor 114 in forwards and in reverse based on control signals from the control unit 105 to control the movement of the work 120 and the head unit 110. The head driver 176 controls the expelling of the liquid 133 from the expulsion heads 116 and, in synchronization with the control of the motor driver 177, has a predetermined plotting operation carried out on the work 120. The pump driver 178 controls the pump 132 corresponding to the expulsion state of the liquid 133 so as to optimally control the supplying of liquid to the expulsion heads 116.

The control unit 105 is constructed so as to provide independent signals via the head driver 176 to the respective oscillators 142. For this reason, the volume of the droplets 150 expelled from the nozzles 117 can be controlled on a nozzle 117 basis in accordance with signals from the head driver 176. In addition, the volume of the droplets 150 expelled from the respective nozzles 117 is variable between 0 pl (picoliters) and 42 pl.

Figure 11A:
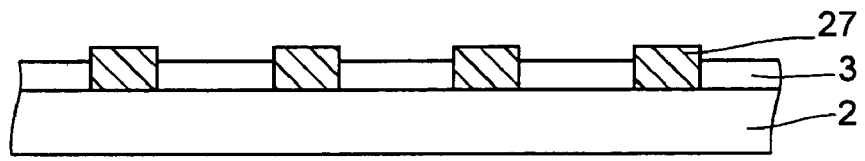
FIGS. 11A to 11D are schematics of the manufacturing process of a color filter.
Figure 11B:
Figure 11C:
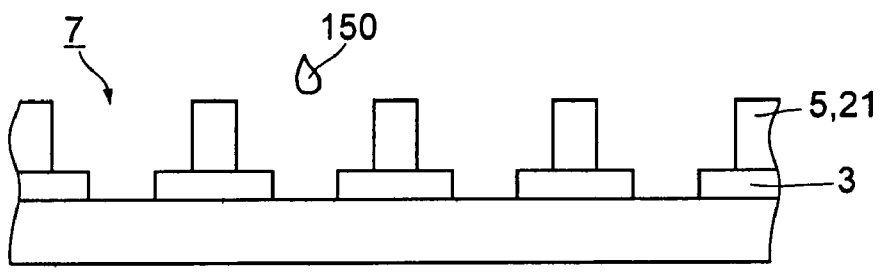

In more detail, a method of manufacturing the color filter 40 of the first exemplary embodiment composed of the rear surface substrate 2, the reflective layer 3, the openings 4, the uncolored boundary layers 5, the colored boundary layers 21, the sprayed parts 7, the colored layers 6R, 6G, and 6B, and the overcoat layer 8 will now be described with reference to FIG. 11A to FIG. 11D. First, as shown in FIG. 11A, an organic resist film 27 is formed in regions that become the openings 4 in the front surface-side surface of the rear surface substrate 2 and a metal thin film of aluminum, chromium, or the like, that forms the reflective layer 3, is formed on the resist film 27 and the rear surface substrate 2 by vapor deposition or the like. The metal thin film is formed so as to tightly adhere to the rear surface substrate 2 but does not adhere to the resist. After the metal thin film has been formed, the resist film 27 and the metal thin film on the resist film 27 are removed using a solvent, thereby forming the reflective layer 3 as shown in FIG. 11B. Next, the uncolored boundary layers 5 composed of a light transmitting resin, such as acryl and the colored boundary layers 21 composed of black resin are formed in a lattice as shown in FIG. 2 by screen printing or the like, so that the sprayed parts 7, that are the regions surrounded by the rear surface substrate 2, the reflective layer 3, and the boundary layers 5, 21, are formed as shown in FIG. 11C.

Here, a method of forming the colored layers 6 by expelling the droplets 150 of a colored liquid onto the sprayed parts 7 using the droplet expelling apparatus 100 will be described using an example where red color liquid is expelled to form the red colored layers 6R. First, the rear surface substrate 2 on which the reflective layer 3, the uncolored boundary layers 5, and the colored boundary layers 21 have been formed, is mounted as the work 120 on the mounting 121. The mounting orientation is set so that, as shown in FIG. 2, the direction in which the colored boundary layers 21 extend is the X-axis direction. The direction in which the uncolored boundary layers 5 extend is the Y-axis direction. While moving the expulsion heads 116 in the X-axis direction relatively to the work 120, as shown in FIG. 8, the droplets 150 of the red colored liquid are expelled. The droplets 150 are arranged in order from the sprayed part 7 at one end to the sprayed part 7 at the other end, such sprayed parts 7 being the red colored layers disposed in a row in the X-axis direction. At this time, the droplets 150 can be simultaneously provided by other nozzles 117 into rows of other sprayed parts 7 that are also red colored layers 6R. By repeating this operation a number of times in accordance with the number of rows of sprayed parts 7 that are the red colored layers 6R, the formation of the red colored layers 6R is completed.

Figure 11D:
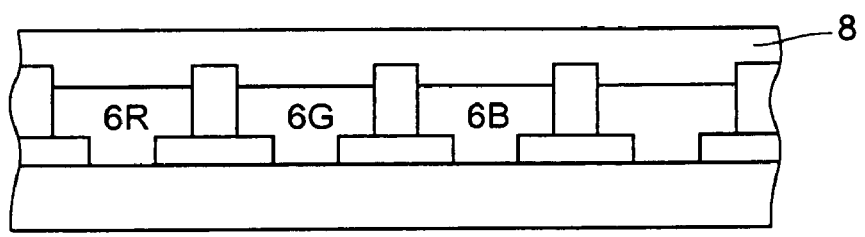

In this case, the boundaries of the red colored layers 6R aligned in the X-axis direction are the uncolored boundary layers 5 that extend in the Y-axis direction and transmit light. Control is carried out to avoid expelling the droplets 150 onto the uncolored boundary layers 5 so that there will be no coloring of the external light Q that is uncolored light. There will be no effect on the performance of the display apparatus if the droplets 150 are expelled onto the colored boundary layers 21. Accordingly, when the droplets 150 are provided into the red colored layers 6R that are rectangular as shown in FIG. 2, the corner parts are regions that are difficult to fill with the droplets 150. To sufficiently fill such corner parts with the droplets 150, it is effective to arrange the droplets 150 so as to slightly impact on the colored boundary layers 21 near the corner parts. The droplet expelling apparatus 100 can selectively expel droplets 150 of a size that can uniformly impact the colored boundary layers 21 on both sides of the red colored layers 6R. By doing so, it is possible to form the colored layers 6 uniformly. In the related art example, a construction is used where uncolored parts provided in parts inside the respective sprayed parts 7 act as the uncolored boundary layers 5 of an exemplary aspect of the present invention. When expelling the droplets 150 into the respective sprayed parts 7, it is necessary to expel the droplets 150 so as to avoid the shapes of the uncolored parts, which makes the control complicated. Such problems are also the same when forming the colored layers 6G and 6B. Next, as shown in FIG. 11D, after the colored layers 6R, 6G, and 6B, have been formed, the overcoat layer 8 is provided so as to cover the colored layers 6R, 6G, and 6B, the uncolored boundary layers 5, and the colored boundary layers 21, thereby completing the color filter 40.

The method of manufacturing the color filter 45 in the second exemplary embodiment is fundamentally the same as that of the color filter 40 of the first exemplary embodiment, so that only the main differences are described below. The resin diffusing layer 32 provided with convexes and concaves on the front surface-side surface is additionally stuck onto the front surface side of the rear surface substrate 2 and the resist film 27 and the diffusing reflective layer 31 are formed on the resin diffusing layer 32. Although the diffusing reflective layer 31 is formed along the convexes and concaves in the surface of the resin diffusing layer 32 due to the diffusing reflective layer 31 being a metal thin film, the diffusing effect is further enhance by providing convexes and concaves in the surface of the diffusing reflective layer 31 by carrying out an oxygen plasma treatment or the like. After this, the processes from the removal of the resist film 27 onwards are the same as for the first exemplary embodiment.

Figure 9:
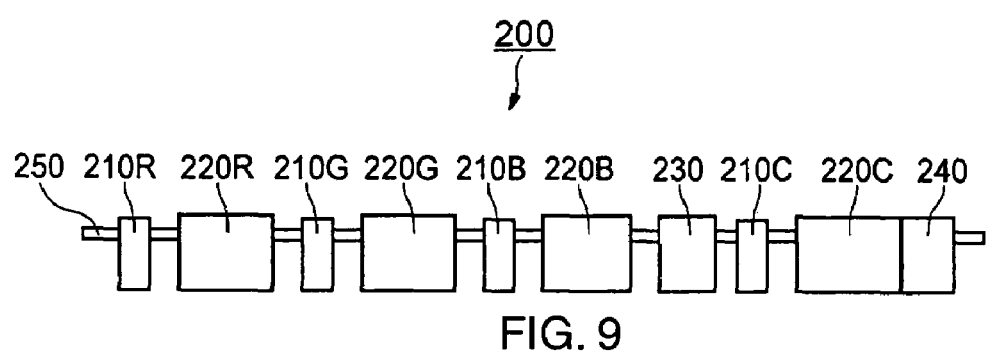
FIG. 9 is a schematic showing a manufacturing apparatus for a liquid crystal display apparatus.

A manufacturing apparatus described below is effective in forming the colored layers 6R, 6G, and 6B efficiently using the droplet expelling apparatus 100. A manufacturing apparatus 200 for the transflective liquid crystal display apparatuses 1,30 shown in FIG. 9 is a group of devices including the droplet expelling apparatus 100 that expels the droplets 150 of colored liquids corresponding to the colored layers 6R, 6G, and 6B shown in FIG. 1 and FIG. 4. The manufacturing apparatus 200 includes an expelling device 210R that applies red colored liquid onto all of the red colored layers 6R onto which red colored liquid is to be applied, a drying device 220R that dries the colored liquid on the red colored layers 6R, an expelling device 210G that applies green colored liquid onto all of the green colored layers 6G onto which green colored liquid is to be applied, a drying device 220G that dries the colored liquid on the green colored layers 6G, an expelling device 210B and a drying device 220B that apply and dry blue colored liquid onto all of the blue colored layers 6B onto which blue colored liquid is to be applied, an oven 230 to reheat (post-baking) the colored liquids of the respective colors, an expelling device 210C that provides the overcoat layer 8 on the post-baked layers of the respective colored liquids, a drying device 220C that dries the overcoat layer 8, and a hardening device 240 that reheats the dried overcoat layer 8 to harden the overcoat layer 8. In addition, the manufacturing apparatus 200 includes a conveyor device 250 that conveys the colored layers 6R, 6Q and 6B to the expelling device 210R, the drying device 220R, the expelling device 210G, the drying device 220G, the expelling device 210B, the drying device 220B, the expelling device 210C, the drying device 220C, and the hardening device 240 in that order.

It should be noted that in prototypes and the like, the expelling device 210R, the expelling device 210G, the expelling device 210B, and the expelling device 210C may be the same droplet expelling apparatus 100. In this case, the head unit 110 is constructed so as to expel the respective colored liquids for the red (R), green (G), blue (B), and the overcoat. For example, when forming the red colored layers 6R, expulsion heads 116 supplied with red (R) colored liquid can be used to achieve the same function as the expelling device 210R of the manufacturing apparatus 200. When forming the green colored layers 6G, expulsion heads 116 supplied with green (G) colored liquid can be used to achieve the same function as the expelling device 210G of the manufacturing apparatus 200. Blue (B) and the overcoat can be handled in the same way. The formation of the uncolored boundary layers 5 and the colored boundary layers 21 of the color filters 40, 45 that was carried out using a dispenser or screen printing, the formation of the oriented films 10, 13 in the transflective liquid crystal display apparatuses 1, 30, and the applying of the liquid crystals 15 can also be carried out by the droplet expelling apparatus 100, with it also being possible to add such functions to the manufacturing apparatus 200 described above.

A method of manufacturing the transflective liquid crystal display apparatus 1, 30 respectively equipped with the color filters 40, 45 according to the first and second exemplary embodiments described above will now be described with the transflective liquid crystal display apparatus 1 shown in FIG. 1 as a representative example. First, the counter electrodes 9 that are composed of transparent ITO (indium tin oxide) are formed corresponding to the respective colored layers 6 on the overcoat layer 8 of the color filter 40 composed of the rear surface substrate 2, the reflective layer 3, the openings 4, the uncolored boundary layers 5, the colored boundary layers 21, the sprayed parts 7, the colored layers 6R, 6G, and 6B, and the overcoat layer 8. In addition, the oriented film 10 is formed of polyimide or the like so as to cover the entire surface of the counter electrodes 9 and the overcoat layer 8 to complete a rear surface substrate part.

The pixel electrodes 12, which like the counter electrodes 9 are composed of ITO, are formed on the rear surface side of the front surface substrate 11 at positions corresponding to the counter electrodes 9. The oriented film 13 is formed of polyimide or the like so as to cover the entire surface of the pixel electrodes 12 and the front surface substrate 11 to complete a front surface substrate part. Next, a rectangular sealing material 14, which has a cutaway part in one part thereof and forms a region for the liquid crystals 15, is formed on the oriented film 10 of the rear surface substrate part by screen printing or the like. Onto the inside of this sealing material 14, the liquid crystals 15 that are kept at a temperature with favorable expulsion characteristics are expelled from the nozzles 117 of the expulsion heads 116 using the droplet expelling apparatus 100. After filling with the liquid crystals 15 is complete, the oriented film 13 surface of the front surface substrate part is stuck onto the sealing material 14, the liquid crystals 15 that overflow from the cutaway part are removed, and then the cutaway part is sealed. At this time, to reduce or prevent problems, such as gaps, being produced in the liquid crystal region and the liquid crystals excessively overflowing, the expelled amount of liquid crystals 15 should preferably be 100% to 110% of the volume of the liquid crystal region.

The front surface polarizing plate 17 and the rear surface polarizing plate 16 are respectively stuck onto the front surface substrate 11 and the rear surface substrate 2, the cushioning material 18 is provided around the rear surface polarizing plate 16, the optical waveguide 19 is stuck on via the cushioning material 18 so as to face the entire surface of the rear surface polarizing plate 16, and the light source 20 is disposed directly on the optical waveguide 19. By doing so, the transflective liquid crystal display apparatus 1 that has superior visibility for colors is completed. The manufacturing process is also the same for the transflective liquid crystal display apparatus 30 that additionally has the resin diffusing layer 32.

Figure 12:
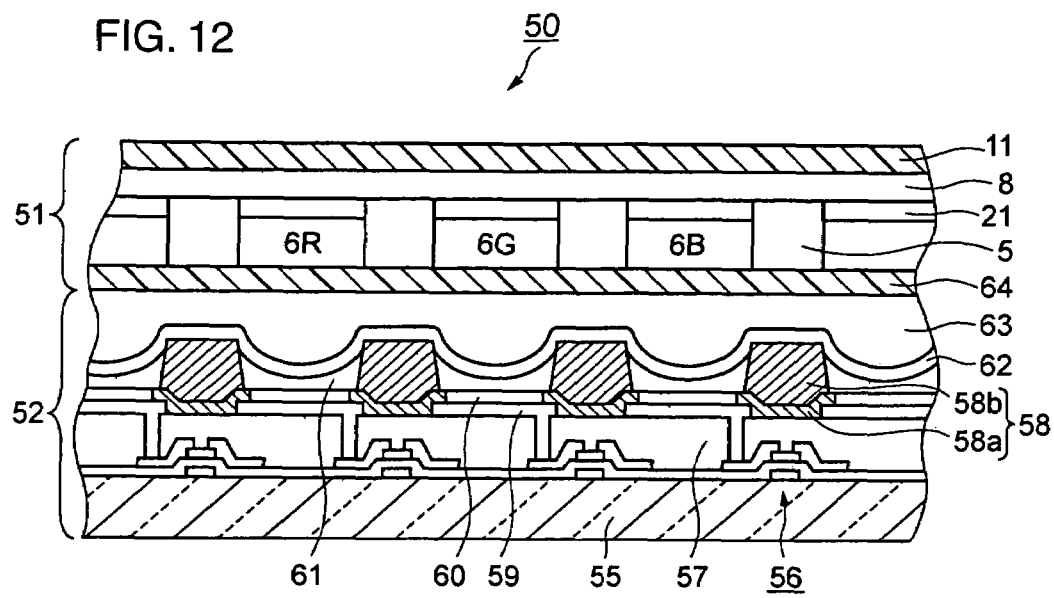
FIG. 12 is a schematic showing an electro-optical apparatus.

Next, an electro-optical apparatus that is a display apparatus in which a color filter including the uncolored boundary layers 5 according to an exemplary aspect of the present invention is combined with an organic EL (electroluminescent) lamp that emits white light will be described. As shown in FIG. 12, an electro-optical apparatus 50 is composed of a color filter unit 51 and an organic EL unit 52.

The color filter unit 51 is composed of the front surface substrate 11, a shared substrate 64 disposed facing the front surface substrate 11, the uncolored boundary layers 5, the colored boundary layers 21, and the colored layers 6R, 6G, and 6B for the respective colors red, green, and blue that are formed on the front surface substrate 11 side of the shared substrate 64, and the overcoat layer 8 that covers the uncolored boundary layers 5, the colored boundary layers 21, and the electrode material layer 6*b*.

The organic EL unit 52 is composed of an EL substrate 55, a plurality of switching elements 56 formed on the EL substrate 55, insulating films 57 formed on the switching elements 56, a plurality of EL pixel electrodes 59 formed on the insulating films 57, banks 58 composed of inorganic banks 58*a* and organic banks 58*b*, hole transporting layers 60 formed on the EL pixel electrodes 59, white light emitting layers 61 formed on the hole transporting layers 60, and EL counter electrodes 62 provided so as to cover the light emitting layer 61 and the banks 58. In addition, the shared substrate 64 of the color filter unit 51 is disposed above the EL counter electrodes 62 with circumferential edge parts of the shared substrate 64 and the EL substrate 55 being stuck together and inert gas 63 being sealed between the shared substrate 64 and the EL counter electrodes 62 to complete the electro-optical apparatus 50.

In this kind of electro-optical apparatus 50, the EL substrate 55, the shared substrate 64, and the front surface substrate 11 are all glass substrates, for example, that transmit light, the colored layers 6R, 6G, and 6B of the color filter unit 51 are disposed in a lattice as shown in FIG. 2. The switching elements 56, the EL pixel electrodes 59, the hole transporting layers 60, and the EL counter electrodes 62 of the organic EL unit 52 are all disposed corresponding to the respective colored layers 6. The hole transporting layers 60 are positioned between the EL pixel electrodes 59 and the light emitting layers 61 and increases the light emitting efficiency of the light emitting layers 61. The EL pixel electrodes 59 and the EL counter electrodes 62 are ITO electrodes, for example, that transmit light, are respectively connected to the switching elements 56, and control the emission of light by the light emitting layers 61. The light emitting layers 61 emit white light that is turned into colored light of one of the colors red, green, and blue by the corresponding colored layers 6 and is emitted from the front surface substrate 11. That is, the organic EL unit 52 acts as a light source corresponding to the individual colored layers 6R, 6G, and 6B.

The hole transporting layers 60 and the light emitting layers 61 that are the principal parts of the organic EL unit 52 can be effectively formed by the droplet expelling apparatus 100. First, the EL substrate 55, on which the switching elements 56, the insulating films 57, the EL pixel electrodes 59, and the banks 58 have been formed, is mounted on the mounting 121 as the work 120, and the X-axis direction and the Y-axis direction for the mounting orientation are determined so as to correspond to the colored layers 6R, 6G, and 6B shown in FIG. 2. While the expulsion heads 116 are moved relatively in the X-axis direction, droplets of a hole transporting layer forming material are expelled so that droplets are provided in order into concave parts defined by the EL pixel electrodes 59 and the banks 58 that are aligned in the X-axis direction. Such relative movement of the expulsion heads 116 is repeated a suitable number of times in accordance with the number of rows of concave parts in the Y-axis direction and the arrangement of the nozzles 117 to complete the hole transporting layer 60. Next, after the droplets of the hole transporting layer forming material have dried, the light emitting layers 61 are formed on the hole transporting layers 60 by expelling droplets of an EL light emitting material in the same way as when the hole transporting layers 60 are formed. After the processing by the droplet expelling apparatus 100 is completed, the light emitting layers 61 are dried, the EL counter electrodes 62 are formed, and the two parts are stuck together with the light emitting layers 61 of the organic EL unit 52 corresponding to the colored layers 6 of the color filter unit 51. After this, finally the inert gas 63 is sealed between the EL counter electrodes 62 and the shared substrate 64.

With the electro-optical apparatus 50, the light emitting layers 61 of the organic EL unit 52 are disposed corresponding to the colored layers 6R, 6G, and 6B of the color filter unit 51, and only the light emitting layers 61 corresponding to the colored layers 6 of required colors emit light, so that an extremely low power-type display apparatus is obtained. Also, bright light that is not colored is emitted from the front surface substrate 11 by the uncolored boundary layers 5 of the color filter unit 51, so that a clear display with favorable overall brightness is achieved. It should be noted that the organic EL unit 52 may be an electron emission element, such as an FED (Field Emission Display) or an SED (Surface-Conduction Electron-Emitter Display).

The color filter, the liquid crystal display apparatus, and the electro-optical apparatus according to an exemplary aspect of the present invention described above can be mounted on a wide variety of electronic appliances that have a display unit, with specific examples of such being a mobile telephone, a wristwatch, an electronic dictionary, a mobile gaming device, a calculator, a portable TV set, a personal computer, a navigation apparatus, and a POS terminal.

What is claimed is:

1. A color filter, comprising:
    a substrate that transmits light;
    a reflective layer that is formed on the substrate and includes openings;
    boundary layers formed on part of the reflective layer; and
    a plurality of colored layers surrounded by the boundary layers,
    the boundary layers that are positioned between colored layers of a same color transmitting light and the boundary layers that are positioned between colored layers of different colors do not transmit light,
    wherein at least two of the colored layers are the same color and are separated by a single one of the boundary layers, and
    wherein at least two of the colored layers are differently colored and are separated by a single one of the boundary layers.

2. The color filter according to claim 1, areas of regions of the colored layers can be set separately by changing widths of the boundary layers.

3. The color filter according to claim 1, the colored layers being formed by droplets of predetermined solutions expelled by an expelling apparatus.

4. A color filter, comprising:
    a substrate that transmits light;
    a reflective layer that is formed on the substrate and includes openings;
    boundary layers formed on part of the reflective layer;
    a plurality of colored layers surrounded by the boundary layers; and
    an overcoat layer formed so as to cover the boundary layers and the colored layers,
    a surface of the reflective layer on which the boundary layers are formed having a convex and concave form that diffuses light, the boundary layers that are positioned between colored layers of a same color transmitting light and the boundary layers that are positioned between colored layers of different colors do not transmit light,
    wherein at least two of the colored layers are the same color and are separated by a single one of the boundary layers,
    wherein at least two of the colored layers are differently colored and are separated by a single one of the boundary layers.

5. The color filter according to claim 4, areas of regions of the colored layers can be set separately by changing widths of the boundary layers.

6. The color filter according to claim 4, the colored layers being formed by droplets of predetermined solutions expelled by an expelling apparatus.

7. The color filter according to claim 4, the overcoat layer being formed so that a thickness in a region corresponding to the reflective layer is thicker than a thickness of other parts.

8. An electronic appliance comprising:
    the color filter according to claim 1.

9. A display apparatus, comprising:
    a substrate that transmits light;
    a reflective layer that is formed on the substrate and includes openings;
    boundary layers formed on part of the reflective layer; and
    a plurality of colored layers surrounded by the boundary layers,
    the boundary layers that are positioned between colored layers of a same color transmitting light and the boundary layers that are positioned between colored layers of different colors do not transmit light,
wherein at least two of the colored layers are the same color and are separated by a single one of the boundary layers,
wherein at least two of the colored layers are differently colored and are separated by a single one of the boundary layers.

10. The display apparatus according to claim 9, areas of regions of the colored layers can be set separately by changing widths of the boundary layers.

11. The display apparatus according to claim 9, the colored layers are formed by droplets of predetermined solutions expelled by an expelling apparatus.

12. A display apparatus, comprising:
a substrate that transmits light;
a reflective layer that is formed on the substrate and includes openings;
boundary layers formed on part of the reflective layer;
a plurality of colored layers surrounded by the boundary layers; and
an overcoat layer formed so as to cover the boundary layers and the colored layers,
a surface of the reflective layer on which the boundary layers are formed having a convex and concave form that diffuses light, the boundary layers that are positioned between colored layers of a same color transmitting light and the boundary layers that are positioned between colored layers of different colors do not transmit light,
wherein at least two of the colored layers are the same color and are separated by a single one of the boundary layers,
wherein at least two of the colored layers are differently colored and are separated by a single one of the boundary layers.

13. The display apparatus according to claim 12, areas of regions of the colored layers can be set separately by changing widths of the boundary layers.

14. The display apparatus according to claim 12, the colored layers being formed by droplets of predetermined solutions expelled by an expelling apparatus.

15. The display apparatus according to claim 12, the overcoat layer being formed so that a thickness in a region corresponding to the reflective layer is thicker than a thickness of other parts.

16. An electronic appliance equipped with the display apparatus according to claim 9.

17. An electro-optical apparatus, comprising:
a color filter unit including colored layers surrounded by a boundary layer including a part that transmits light; and
an organic EL unit including separate light sources corresponding to the respective colored layers,
wherein at least two of the colored layers are the same color and are separated by a single one of the boundary layers that transmits light,
wherein at least two of the colored layers are differently colored and are separated by a single one of the boundary layers.

18. An electronic appliance equipped with the electro-optical apparatus according to claim 17.

* * * * *